C. H. ALLEN.
VALVE MECHANISM.
APPLICATION FILED MAY 28, 1920.
1,430,427.
Patented Sept. 26, 1922.
2 SHEETS—SHEET 1.
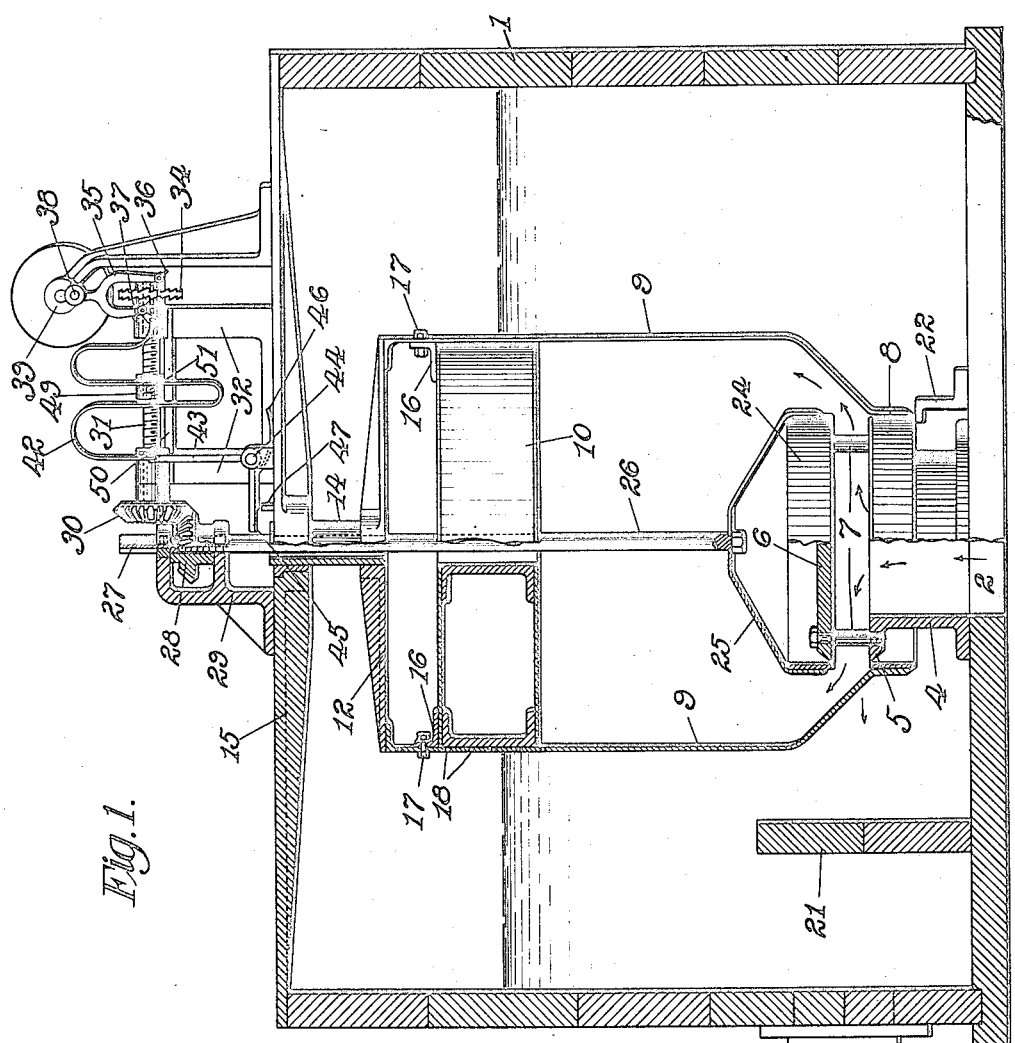
Fig. 1.
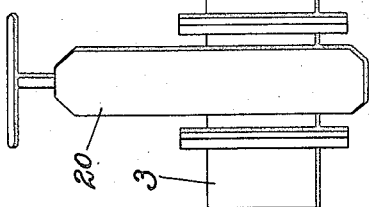
Inventor.
Carlton H. Allen
by J. H. McCrady
his Atty.

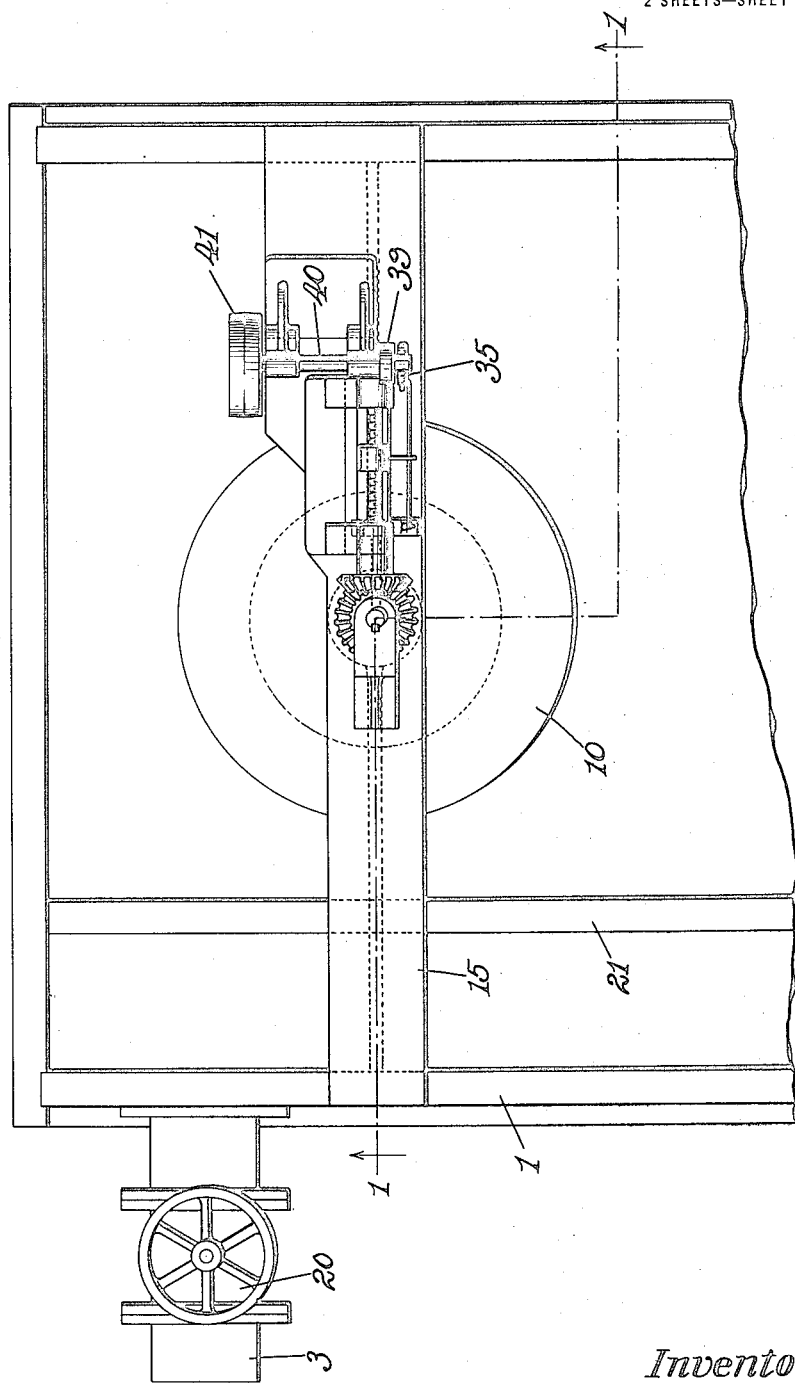

Patented Sept. 26, 1922.

1,430,427

UNITED STATES PATENT OFFICE.

CARLTON H. ALLEN, OF MILLINOCKET, MAINE, ASSIGNOR OF ONE-HALF TO GREAT NORTHERN PAPER COMPANY, OF MILLINOCKET, MAINE, A CORPORATION OF MAINE.

VALVE MECHANISM.

Application filed May 28, 1920. Serial No. 384,943.

*To all whom it may concern:*

Be it known that I, CARLTON H. ALLEN, a citizen of the United States, residing at Millinocket, in the county of Penobscot and State of Maine, have invented a new and useful Improvement in Valve Mechanisms, of which the following description, in connection with the accompanying drawings, is a specification, like reference characters on the drawings indicating like parts in the several figures.

This invention relates to valve mechanisms and is especially concerned with the requirements of valves for use in controlling the flow of paper pulp, soft stock, or other fluid in which a substantial percentage of solid material is held in suspension in the liquid whose flow is to be controlled. Valves of this character and especially those used to control the flow of ground wood pulp or sulphite slush pulp, are especially liable to become clogged with solid material. The prior constructions of valves give much trouble because of the necessity for frequent cleaning, and the present invention has for one of its important objects to devise a valve construction in which the liability of clogging will be greatly reduced and which can be quickly, easily, and thoroughly cleaned. It is a further object of the invention to devise a valve construction for a tank or other container which will so control the flow of liquids automatically as to maintain a substantially constant level and which will be capable of handling large flows and will compensate for wide variations in such flows.

The nature of the invention will be readily understood from the following description when read in connection with the accompanying drawings, in which—

Figure 1 is a cross sectional view of a valve mechanism embodying the invention in the form at present preferred; and Fig. 2 is a plan view of the mechanism shown in Fig. 1.

The invention is herein disclosed as embodied in an automatic valve designed to maintain a substantially constant level in containers of the type used in the manufacture of pulp and paper. In the construction shown, 1 designates a tank or vat having an inlet 2 and an outlet 3. Mounted within the vat is a stationary valve element comprising a short pipe section or nipple 4 having a flange-like head 5 beveled, as shown in the drawings, to provide a sharp peripheral edge, this valve element also including a disk-like member 6 supported from the part 4 by a series of spacing studs or bolts 7. It will be seen from an inspection of Fig. 1 that the space between the two parts 5 and 6 provides a port of annular or cylindrical form. The liquid flows through the apparatus in the direction indicated by the arrows so that the port just referred to is the inlet port when this particular direction of flow is maintained.

A movable valve element or gate 8 cooperates with the stationary element just described to control the flow of liquid through the valve. This gate consists of a short annular member closely surrounding the part 5 and connected by two arms 9—9 to a float 10. The parts 9—9 are extended above the float and connected by a yoke 12 to the central portion of which is fixed a sleeve 14 that slides in a vertical hole formed in a bracket or support 15 that spans the top of the vat 1. The float 10 may be of any suitable construction but preferably is a separate unit from the parts 9—9 and is adjustably secured to these parts by brackets 16 and bolts 17. Each of these arms 9 is provided with a series of holes 18 to receive the bolts 17 so that the elevation of the float above the valve may be adjusted.

The discharge of pulp or other liquid from the vat is controlled by a valve 20, and it will be evident that as this discharge varies, the level of the liquid in the tank or vat 1 will rise or fall. The float 10 following this change in liquid level will raise or lower the annular gate 8 and this will act directly to increase or decrease the flow through the valve as may be required to maintain the liquid levels substantially constant. A baffle 21 prevents the pulp from cutting across directly from the inlet to the outlet and thus exerting a side strain on the annular gate 8. In other words, it tends to so equalize the flow in all directions from the inlet 2 that the lateral forces exerted on the annular gate 8 due to the current will be equalized. When the gate 8 drops far enough to expose the entire width of the port, any further lowering movement of the gate and the float is prevented by a stop 22 against which the gate 8 strikes.

The valve mechanism above described may be used without any additional mechanism in many locations and such a mechanism responds quickly to changes in the liquid level in the tank regardless of the cause producing such changes. For the purpose of compensating automatically for changes in these factors which continue for long periods, an additional mechanism is provided for automatically closing the inlet port more or less. This mechanism comprises an annular gate 24 similar in construction to the gate 8 and mounted above the latter gate. Braces 25 connect this upper gate 24 with a rod 26 that extends freely through the float 10 and the sleeve 14, and is threaded at its upper end as indicated at 27. This threaded portion 27 engages an internal thread in a bevel gear 28 rotating in a bracket 29 secured to the support 15. The gear 28 meshes with another bevel gear 30 secured to a horizontal shaft 31 that rotates in bearings provided in brackets 32—32 mounted on the part 15. This shaft 31 also has fixed thereto a ratchet wheel 34 having oppositely directed ratchet teeth on its opposite faces. A U-shaped or double pawl 35 straddles this ratchet wheel 34 and carries oppositely directed pawl points 36 and 37, to engage, respectively, the opposite sets of teeth on the ratchet wheel 34. The pawl 35 is constantly driven and for this purpose is mounted on an eccentric pin 38 carried by a disk 39 that is mounted fast on a shaft 40 having a pulley 41 by means of which it may be belted to a suitable source of power.

The shaft 40 is constantly rotated and the pawl 35 normally reciprocates up and down without doing any work. That is, it is normally held in such a position that neither of the pawl points 36 or 37 can engage the ratchet wheel 34. This function is performed by a curved spring 42 which is connected with the upper arm 43 of a bell crank lever, fulcrumed at 44, and having a lower substantially horizontal arm 45. When the float 10 rises far enough to raise the upper edge of the sleeve 14 into engagement with the arm 45 of the bell crank lever just described, the rocking movement of the lever so produced swings the pawl point 37 into engagement with the ratchet wheel, thus enabling the pawl to rotate this wheel step by step in a direction to effect the lowering of the gate 24 through the connections above described. This reduces the flow through the valve and thus tends to neutralize the conditions that caused the rise of the float 10.

For the purpose of stopping the movement of the upper gate 24 automatically, the shaft 31 is threaded, as shown, and an internally threaded block 49, mounted on this threaded portion and arranged to slide along a plate 50, carries a pin 51 that projects between the arms of a loop in the spring 42. The thread on the shaft 31 is left-handed so that the rotation of the shaft produced by the pawl point 37 carries the block 49 and the pin 51 toward the left, as the parts appear in Fig. 1, and consequently when the shaft has made a substantially predetermined number of revolutions and thus moved the gate 24 a predetermined distance, the pin 51 engages the left-hand side of the loop in the spring 42 and moves this spring far enough to swing the pawl point 37 out of contact with the ratchet wheel 34. When the float 10 drops again the spring 46 swings the lever 45 in a counterclockwise direction and thus tends to move the pawl 35 to bring the pawl point 36 into engagement with the ratchet wheel 34 and cause a reverse movement of the upper gate 24. The normal position of the lower gate 8 is about midway between the disks 5 and 6 of the stationary valve so that the sleeve 14 holds the arm 45 of the bell crank lever slightly off the stop pin 47 and thus maintains the pawl 35 in its neutral or inoperative position. This mechanism thus is very sensitive to changes in the level of the float 10. The two valve gates 8 and 24 move toward each other to reduce the flow of fluid through the valve and away from each other to increase said flow or to open the valve. It will be seen that the bevelling of the edges of the parts 5 and 6 so that these edges are relatively sharp reduces the friction between the gates 8 and 24 and the cooperating stationary parts of the valve.

It will be understood that either of the movable gates and its actuating mechanism may be used without the other, and it is contemplated that for certain purposes one only of the mechanisms here provided will be used. In other relationships it is preferred to use both mechanisms.

It will be seen that the construction here provided is particularly well adapted for those classes of service in which relatively large volumes of liquid must be handled and in which the liquid carries a certain amount of solid material. That is, the construction of the valve is such that the flow of fluid through it tends to keep it clear and there is very little opportunity for solid material to lodge where it would cause sticking or clogging of the valve. Furthermore, the very open construction of the valve makes it possible for the valve to be quickly, easily, and thoroughly cleaned.

It will also be understood that while I have herein shown and described the best embodiment of the invention of which I am at present aware, this embodiment may be modified in many particulars without departing from the spirit or scope of this invention.

What is claimed as new is:

1. A valve mechanism of the character described comprising a valve element having an annular port therein, an annular element for closing said port more or less, and means for relatively moving said elements to vary the flow of fluid through said port.

2. A valve mechanism of the character described comprising a valve element having an annular port therein, an annular element for closing said port more or less, and a float for relatively moving said elements to vary the flow of fluid through said port.

3. A valve mechanism of the character described comprising a valve element having an annular port therein, an annular element for closing said port more or less, and power driven means for relatively moving said elements to vary the flow of fluid through said port.

4. A valve mechanism of the character described comprising a valve element having an annular port therein, two annular elements relatively movable toward and from each other to close said port more or less, and means for producing said relative movement.

5. A valve mechanism of the character described comprising a valve element having an annular port therein, two annular elements movable toward and from each other to close said port more or less, a float for moving one of said annular elements, and additional means for moving the other of said annular elements.

6. A valve mechanism of the character described comprising a valve element having an annular port therein, two annular elements movable toward and from each other to close said port more or less, a float for moving one of said annular elements, and power driven means for moving the other annular element.

7. A valve mechanism of the character described comprising a stationary valve element having an annular port therein, an annular gate cooperating with said element to control the flow of fluid through said port, and power driven means for adjusting said gate.

8. A valve mechanism of the character described comprising a stationary valve element having an annular port therein, an annular gate cooperating with said element to control the flow of fluid through said port, power driven means for adjusting said gate, and a float controlling the operation of said power driven means.

9. A valve mechanism of the character described comprising two movable valve elements for controlling the flow of fluid through the valve, means responsive to variations in fluid conditions for moving one of said elements, and additional means for adjusting the other of said elements.

10. A valve mechanism of the character described comprising two movable valve elements for controlling the flow of fluid through the valve, a float connected with one of said elements to move it, and means for positively adjusting the other of said elements.

11. A valve mechanism of the character described comprising two movable valve elements for controlling the flow of fluid through the valve, a float connected with one of said elements to move it, and power driven means automatically responsive to changes in fluid conditions for adjusting the other element.

12. A valve mechanism of the character described comprising a valve element having a fluid passage therethrough and having a circular projecting edges spaced apart to provide a port between them, an annular gate cooperating with said edges to close said port more or less, and means for relatively moving said element and gate to control the flow of fluid through said port.

13. A valve mechanism of the character described comprising a valve element having a fluid passage therethrough and having circular projecting edges spaced apart to provide a port between them, an annular gate cooperating with said edges to close said port more or less, said edges being bevelled to provide thin surfaces adjacent to said gate, and means for relatively moving said element and gate to control the flow of fluid through said port.

14. A valve mechanism of the character described comprising a valve element having a fluid passage therethrough and having circular projecting edges spaced apart to provide a port between them, an annular gate closely surrounding said edges and cooperating with them to close said port more or less and means for relatively moving said element and gate to control the flow of fluid through said port.

15. A valve mechanism of the character described comprising cooperating relatively movable valve elements, a float, means for relatively moving said elements comprising a constantly operated double pawl, a rotatable shaft, a double faced ratchet wheel fast on said shaft and with which said pawl cooperates, connections for transmitting motion from said shaft to one of said valve elements to adjust it, connections between said float and said pawl whereby the position of the float controls the operative connection between the pawl and said ratchet wheel, said shaft being screw threaded, and a member engaged by said thread and arranged to be moved thereby and operative through said connections between the float and the pawl to interrupt the action of the pawl on the ratchet wheel when a predetermined adjusting movement of the valve has been effected.

In testimony whereof I have signed my name to this specification.

CARLTON H. ALLEN.